US008145938B2

United States Patent
Gupta

(10) Patent No.: US 8,145,938 B2
(45) Date of Patent: Mar. 27, 2012

(54) FENCING MANAGEMENT IN CLUSTERS

(75) Inventor: Prashant Kumar Gupta, Bangalore (IN)

(73) Assignee: Novell, Inc., Provo, UT (US)

( * ) Notice: Subject to any disclaimer, the term of this patent is extended or adjusted under 35 U.S.C. 154(b) by 150 days.

(21) Appl. No.: 12/475,720

(22) Filed: Jun. 1, 2009

(65) Prior Publication Data

US 2010/0306573 A1 Dec. 2, 2010

(51) Int. Cl.
*G06F 11/00* (2006.01)

(52) U.S. Cl. ........................................... 714/4.2
(58) Field of Classification Search ............... 714/4, 4.2
See application file for complete search history.

(56) References Cited

U.S. PATENT DOCUMENTS

| | | | | |
|---|---|---|---|---|
| 5,568,491 | A * | 10/1996 | Beal et al. | 714/746 |
| 5,675,724 | A * | 10/1997 | Beal et al. | 714/4 |
| 5,996,075 | A * | 11/1999 | Matena | 726/10 |
| 6,108,699 | A * | 8/2000 | Moiin | 709/221 |
| 6,192,443 | B1 * | 2/2001 | Mendel | 711/1 |
| 6,212,595 | B1 * | 4/2001 | Mendel | 711/1 |
| 6,226,717 | B1 * | 5/2001 | Reuter et al. | 711/147 |
| 6,965,936 | B1 * | 11/2005 | Wipfel et al. | 709/224 |
| 7,590,737 | B1 * | 9/2009 | Chen et al. | 709/226 |
| 7,739,541 | B1 * | 6/2010 | Rao et al. | 714/4 |
| 2003/0023680 | A1 * | 1/2003 | Shirriff | 709/204 |
| 2004/0210656 | A1 * | 10/2004 | Beck et al. | 709/225 |
| 2005/0283641 | A1 * | 12/2005 | Clark et al. | 714/4 |
| 2007/0022314 | A1 * | 1/2007 | Erasani et al. | 714/4 |

FOREIGN PATENT DOCUMENTS

| | | |
|---|---|---|
| EP | 887731 A1 | 12/1998 |
| WO | WO-9716744 A1 | 5/1997 |

* cited by examiner

*Primary Examiner* — Joshua Lohn
(74) *Attorney, Agent, or Firm* — Schwegman, Lundberg & Woessner, P.A.

(57) ABSTRACT

Apparatus, systems, and methods may operate to detect a failure in a failed one of a plurality of nodes included in a cluster, and to fence a portion of the plurality of nodes, including the failed one. Membership in the portion may be determined according to an aggregated value of weighted values assigned to resources and/or services associated with the cluster. Additional apparatus, systems, and methods are disclosed.

23 Claims, 4 Drawing Sheets

FENCING MANAGEMENT IN CLUSTERS

BACKGROUND

Service availability within clusters involves the allocation of resources and services, including failover planning for alternate machines. The cluster infrastructure is monitored, and when a failure is identified, some part of the cluster is fenced, or isolated from the rest to prevent manifestations of the failure from propagating throughout the rest of the cluster. Thus, fencing forms part of the corrective action used to reduce the harm that might be caused within a cluster of nodes due to hardware and software failures.

Node fencing can be achieved using various techniques known to those of ordinary skill in the art, such as Small Computer System Interface-3 (SCSI-3) Persistent Group Reservation (PGR), SCSI-Reserve/Reset/Release, exclusive volume access, marking a pre-defined location on the disk for node status and action, etc. Each has some mechanism to determine which nodes are being fenced, and to initiate system abort activity.

In the case of split brain or network partition cluster operation, fencing operations typically determine survival based on retaining the largest number of operational nodes. In the instance of a pure split brain, the fenced side may simply be the side that loses the race for survival. Unfortunately, the fenced side may also be the side providing the most important services within the cluster. This type of fencing can add to service downtime, which in turn may result in lost business opportunities.

SUMMARY

In various embodiments, apparatus, systems, and methods that provide fencing management in clusters are provided. For example, in some embodiments, fencing management is implemented by detecting a failure in a failed one of a plurality of nodes included in a cluster, and fencing a portion of the plurality of nodes, including the failed one. Membership in the fenced portion can be determined according to an aggregated value of weighted values assigned to resources and/or services associated with the cluster. Additional embodiments are described, and along with the foregoing example, will be set forth in detail below.

DETAILED DESCRIPTION

Figure 1:
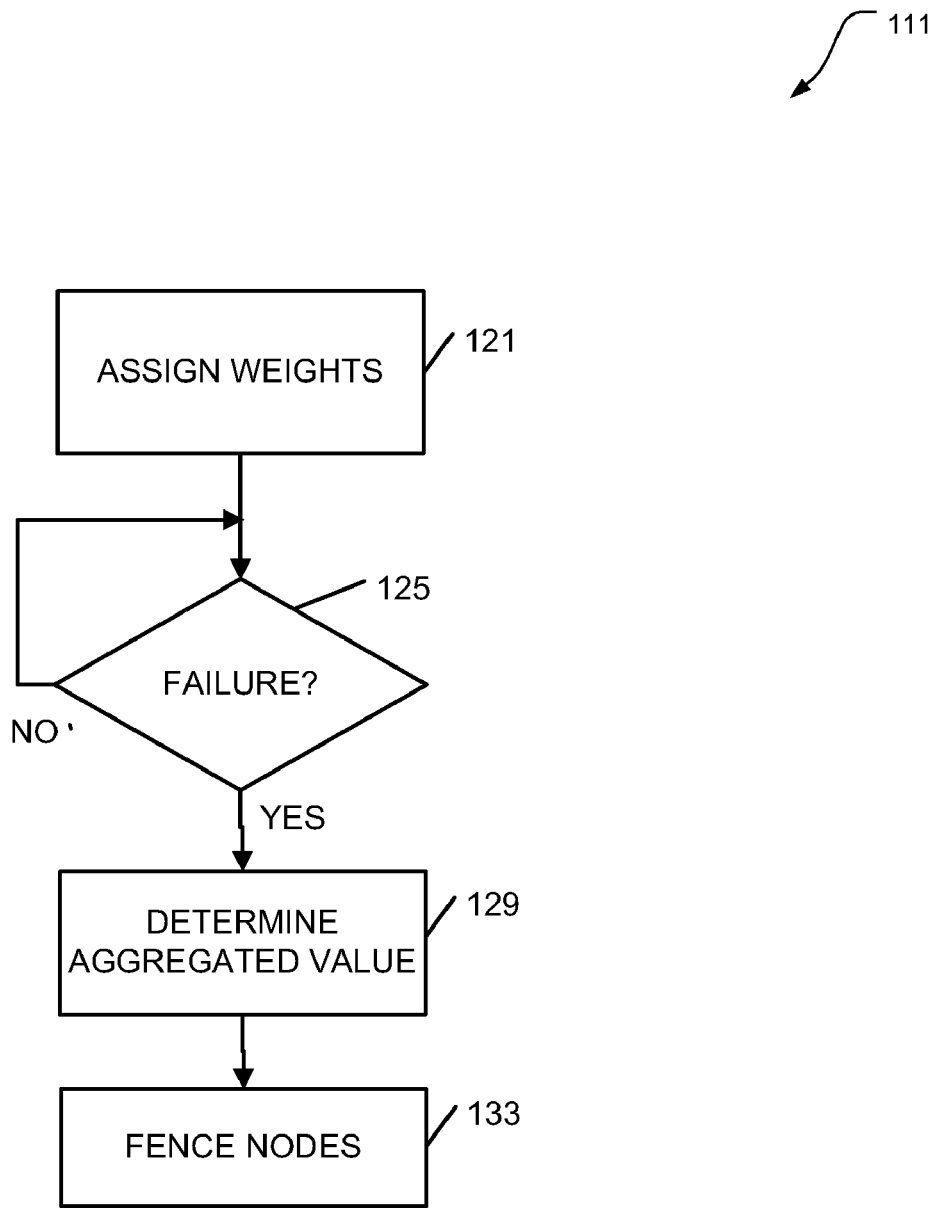
FIG. 1 is a flow diagram illustrating methods of fencing management in clusters according to various embodiments of the invention.

Some of the challenges described above may be addressed by initiating the operation of a cluster membership module that operates to check the health of nodes in a cluster. For example, each of the nodes in a cluster may wake up periodically to announce to the cluster that they are alive. The cluster membership module can monitor this activity, so that if a particular node has not reported within some selected period of time, the failure to report is investigated. If the failure is of a serious nature, operation of a fencing module can be initiated.

The fencing module can thus be initiated when a system or sub-system failure is detected, either by the cluster membership module, or by some other mechanism. The fencing module can operate to run through various system checks prior to fencing convergence to pill/shutdown some of the existing clustered nodes. The module can divide the cluster into portions, allocating various components to each portion according to a set of assigned weighted values.

The fencing module can determine the portion of the cluster to shut down by determining which nodes can communicate after a failure is detected. The failed component(s) are isolated into the portion having the lowest weighted value at that point, leaving those nodes that can communicate amongst themselves outside of the fenced portion. The fencing module can operate to determine an aggregated value of pre-configured weights allocated to services and resources running on the various portions of the cluster, so that fencing occurs with respect to the portion having a lower aggregate weighted value.

A resource is an entity that can be used by a machine or user, and that has limited availability. Some resources are exclusive, and some are shared. Common examples of resources arranged in order of greater importance to lesser importance according to some embodiments include, but are not limited to: storage (e.g., disks); floating internet protocol (IP) addresses within a cluster, perhaps taken from of a range of available addresses; storage interfaces; network interfaces; and processing units. The resources in this list are arranged according to those that may be weighted with a higher value first, to those with a lower value last, according to some embodiments.

Sometimes configured resources may be viewed as services. Common examples of services arranged from most important to least important according to some embodiments, include, but are not limited to: databases; web services (e.g., hosting a web site); file access services (e.g., the Network File System); domain name resolution services (e.g., Domain Name System (DNS)); dynamic network address assignment services (e.g., Dynamic Host Configuration Protocol (DHCP)). The services in this list are arranged according to those that may be weighted with a higher value first, to those with a lower value last, according to some embodiments. Typically, resources overall are weighted more highly than services, because certain resources may be required to provide selected services (e.g., a shared storage resource within a cluster may need to exist in order to offer a useful database service). Weights for resources and services may be assigned by the network administrator depending on the policy and business of the organization responsible for cluster operations.

For example, a cluster section running a database and web access service in the e-commerce business sector might be made more readily available than other services, such as those which print large quantities of reports. Thus, the database/web access services may have a high relative weighted value compared to the printing services. As matter of contrast, clustered DNS services, DHCP services, and mail services may have lower weighted values, and thus, can failover when deployed in the same cluster. In this way, nodes running services that are more important to a particular business may be minimally fenced, and thus availability of the system overall is higher than it might otherwise be if ordinary fencing approaches are taken, especially in a split brain situation.

For example, assume that four nodes are in a cluster in a split brain situation, with two nodes in one portion and two nodes in another portion, where one of the two nodes in one half of the cluster is failed. Nodes within each half can communicate within that half, but not across the network, or "brain". In this case, the fencing module can operate to add up the weights of services and resources in each half of the cluster, so that the half/portion having the lowest overall weighted value is fenced, and the other half is not.

As a more specific example, assume the weights are assigned to be used in a linear equation for fencing, where $r(w)_{service} = f(w_{service}) + C$, $w_{service}$ = weight assignment for a service, C = normalization constant, f(w) = linear function of the assigned weight, and r(w) = result factor of weight for a given clustered service. Then the total weight of a node running in a cluster will be $R(w)_{node} = \Sigma\, r(w)_{service}$ (for all services running on a node, i=0 to N).

Thus, in a cluster, the weight of a node will be proportional to the weight of all the services running on that node. While recovering from a split-brain failure, the cluster may decide to fence the number of nodes that have a lower aggregate value. After a split brain failure event:

$$(R(w)_{nodeA[1]} + \ldots + R(w)_{nodeA[N]}) > (R(w)_{nodeB[1]} + \ldots + R(w)_{nodeB[N]}),$$ where A & B are two partitions of the split brain.

In this case, the cluster may decide to survive nodes in partition A and fence nodes in partition B. All the services running on nodes in partition B can then be failed-over to the surviving nodes in partition A.

After initialization of the fencing module, events are posted by the module for pilling/shutting down nodes that are to be removed from current membership in the cluster. Shutdown is a graceful power-down operation (e.g., buffers are first flushed to disk, then the unit in question is shut down). Pilling is a more immediate type of power-down operation—usually accomplished without a buffer flush. Thus, after the fencing module is activated, and the failure mechanism is determined, the nodes that will be pilled/shutdown are posted, and the rest of the nodes are allowed to survive. Nodes can pill themselves upon notification.

Service/resource failover can then be initiated, so that various services/resources are moved to the remaining (unfenced) cluster nodes and made available to the rest of the cluster. Services can then recover (e.g., as might be needed for some database systems) and then the services can be re-started. At this point, clients can re-connect to the unfenced nodes in the cluster. Thus, fencing decisions can be made based on business logic and the criticality of the services and resources that are provided.

Therefore, many embodiments of the invention may be realized, and each can be implemented in a variety of architectural platforms, along with various operating and server systems, devices, and applications. Any particular architectural layout or implementation presented herein is thus provided for purposes of illustration and comprehension only, and is not intended to limit the various embodiments.

FIG. 1 is a flow diagram illustrating methods 111 of fencing management in clusters according to various embodiments of the invention. The methods 111 are implemented in a machine-accessible and readable medium. The methods 111 are operational over processes within and among networks. The networks may be wired, wireless, or a combination of wired and wireless. The methods 111 may be implemented as instructions, which when accessed by a specific machine, perform the processing depicted in FIG. 1. Given this context, fencing management in clusters is now discussed with reference to FIG. 1.

In some embodiments, perhaps as viewed from a fencing node (e.g., a node that includes both a cluster membership and fencing module), a processor-implemented method 111 to execute on one or more processors that perform the method 111 may operate to accomplish fencing management in clusters by beginning at block 121 with assigning weighted values to a variety of resources and services. Different weighting scales may be used. For example, one scale of weights may be used for resources and another for services. Thus, the activity at block 121 may include assigning a first portion of the weighted values based on relative resource value, and a second portion of the weighted values based on relative service value.

As noted previously, resources within a cluster may comprise a number of components. Thus, the resources may comprise one or more of a processing unit, storage, a storage interface, a network interface, or a floating internet protocol address within the cluster, among others.

Similarly, a wide variety of services may be provided by the cluster. Thus, available services may comprise one or more of a database, a web site hosting service, a file access service, or a domain name resolution service, among others.

The weighted values may be assigned in many different ways, such that the assignment of values may influence how fencing will ultimately be accomplished. Thus, in some embodiments, weights may be assigned so that the weighting is allowed to change, based on the identity of a client coupled to the cluster and/or the time of day, among others. For example, a payroll client that couples to the cluster might provide the impetus to increase the value of certain services, such as bandwidth allocation and storage. In some embodiments, services may be assigned a greater weighted value at a particular time than at other times, such as near the end of a working day, on weekends, during a particular holiday, over a particular month, or as a new year begins. Therefore, the activity at block 121 may include assigning a portion of the weighted values dynamically, based on at least one of a client identity or a time.

In some embodiments, the weights assigned may depend on how many resources and services exist as each weight is assigned, or some number of each that is projected to exist after all weights are assigned. Thus, the activity at block 121 may include assigning a portion of the weighted values that depends on the relative number of the resources and/or the services that exist at the time of assignment, or that are forecast to exist at a future time.

The weights assigned may also depend on how many resources exist, versus the number of services that exist. Thus, the activity at block 121 may include assigning a portion of the weighted values that depends on the ratio of the number of resources to the number of services.

In some embodiments, weights can be assigned by a variety of entities, including a client entity, a user, a manufacturer, or an administrator for assignment, in the present or in the future. Weights can also be preconfigured for well-known services. Thus, the activity at block 121 may include assigning a portion of the weighted values according to an administrator policy or a pre-selected resource and/or service configuration.

If a weight is not specified for a resource or service, a default value, such as zero, one, or one-hundred, can be assigned. Thus, the activity at block 121 may include assigning some of the weighted values as default values to resources and/or services that do not otherwise have an assigned value.

The method 111 may continue on from block 121 to block 125, with detecting a failure in a failed one of a plurality of nodes included in the cluster. If no failure has occurred, then the method 111 may loop back on block 125. If a failure is detected at block 125, then the method 111 may continue on to block 129 with determining one or more aggregated values of the assigned weights.

Aggregation may occur using any type of function, from simple addition to more complex functions, each with a deterministic aggregating value. Thus, the activity at block 129 may include determining the aggregating value as a deterministic function of the weighted values.

Aggregation may also occur in more complex ways, such as a function of the way that weights are apportioned between the resources and the services. Thus, the activity at block 129 may include determining the aggregated value as a function of a first portion of the weighted values associated with the resources, and a second portion of the weighted values associated with the services.

Once the aggregated values are determined, they can then be used by a policy to fence failing components. Therefore, the method 111 may continue on from block 129 to block 133, with fencing a portion of the plurality of nodes, including the failed one. Membership in the fenced portion can be determined according to the aggregated value of weighted values assigned to at least one of resources or services associated with the cluster.

In this way, the method 111 may operate to detect a failure within a cluster, and then to fence nodes according to the aggregated weighting of associated resources and services. The aggregated value may be the greatest value, the least value, or selected according to some other criterion, such as falling within a range of values. Other embodiments may be realized.

Figure 2:
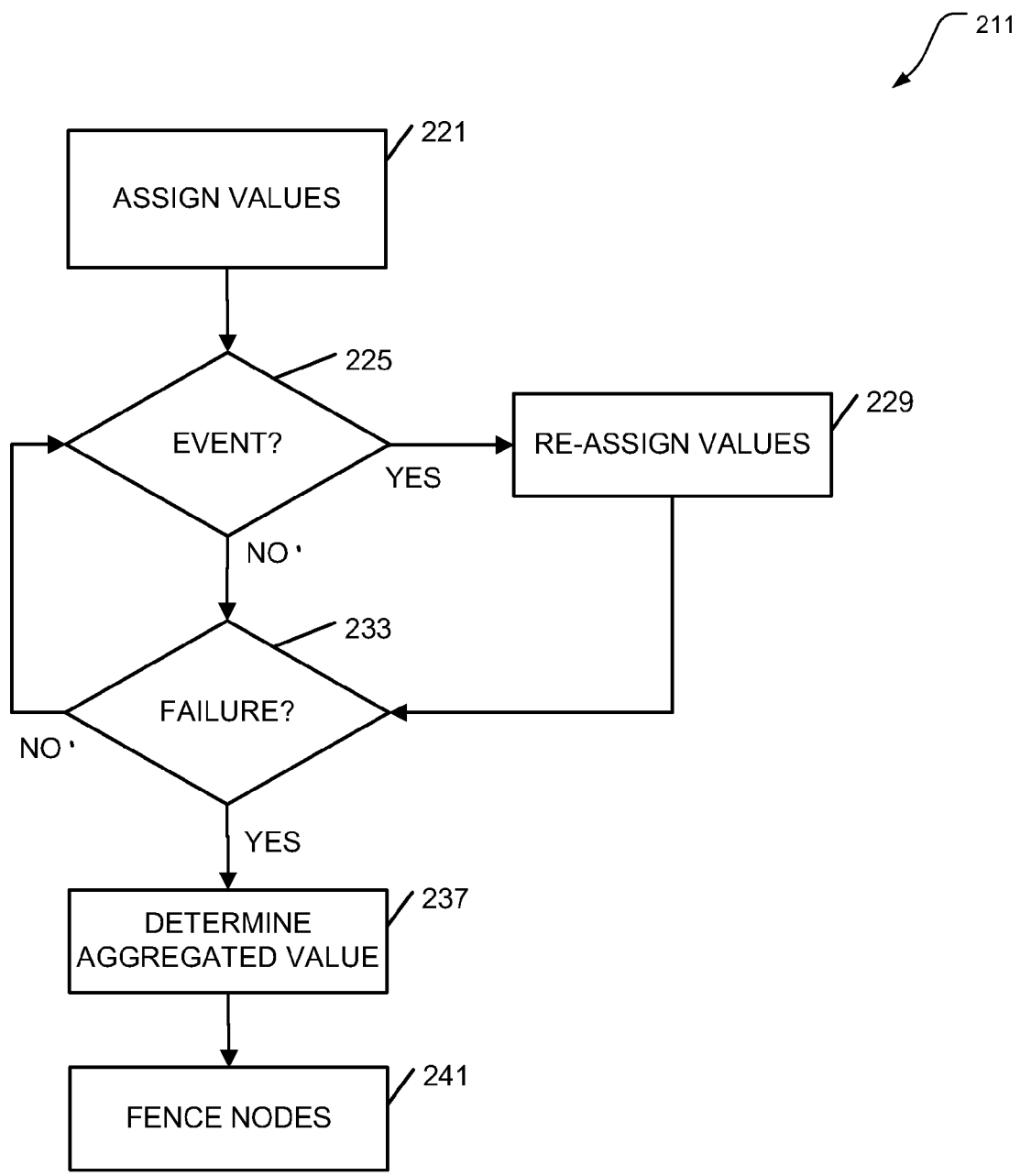
FIG. 2 is another flow diagram illustrating methods of fencing management in clusters according to various embodiments of the invention.

For example, FIG. 2 is another flow diagram illustrating methods 211 of fencing management in clusters according to various embodiments of the invention. In this case, fencing management is described so as to emphasize distributed processing within the cluster. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2.

In many embodiments, to manage fencing in clusters, a processor-implemented method 211 to execute on one or more processors that perform the method 211 may begin with assigning weighted values to at least one of resources or services associated with a plurality of nodes in a cluster. For example, generic resource types (e.g., storage, network interface) can be identified, and weights can be assigned accordingly. Thus, the activity at block 221 may include assigning the weighted values to the resources according to a resource type. Similarly, generic service types (e.g., web site hosting, domain name resolution) can be identified, and weights can be assigned accordingly. Thus, the activity at block 221 may include assigning the weighted values to the services according to a service type.

The assigned values can be changed after initial assignment, perhaps based on an event that occurs inside/outside the cluster, or based on the time of day, etc. Thus, the method 211 may include detecting the occurrence of an event at block 225. If the selected event occurs (e.g., a specific time of day is detected), then the method 211 may continue on to block 229 with re-assigning some of the weighted values in response to at least one of an event occurring within the cluster, an event occurring outside the cluster, or a time. The method 211 may then include looping back to block 225 to detect the occurrence of additional events of the same type, or different events.

If no event is detected at block 225, the method 211 may continue on to block 233 with determining whether a failure has occurred within the cluster of nodes at block 233. For example, a cluster membership module can monitor announcements from nodes in the cluster. If announcements no longer occur after some predetermined time period, the node that has not made its announcement in a timely fashion may be considered to have failed. Thus, the activity at block 233 may include detecting the existence of a failed one of the nodes in a cluster as a result of communicating with a cluster membership module. If no failure is detected, then the method 211 may continue to loop back to block 225 (as shown) to determine whether selected events have occurred.

If a failure is detected at block 233, then the method 211 may include continuing on to block 237, with determining an aggregated value of the weighted values for various portions of the cluster. The aggregated values may be determined in a number of ways, including determining the aggregated value as a function of the weighted values assigned only to the resources or only to the services, for example. Other aggregations methods are possible.

The method 211 may then include going on to block 241 with fencing a first portion of the cluster, the first portion having a lower aggregated value of the weighted values than a second portion of the cluster that is not fenced. While such would be the case when lower weights equate to less value, the embodiments described herein are not to be so limited. Reverse weighting (equating cluster elements of less value with higher weights) may also occur.

The methods of managing fencing in clusters shown in FIGS. 1 and 2 can be implemented in a computer-readable storage medium, where the methods are adapted to be executed by one or more processors. Further details of such embodiments will be provided below.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

Figure 3:
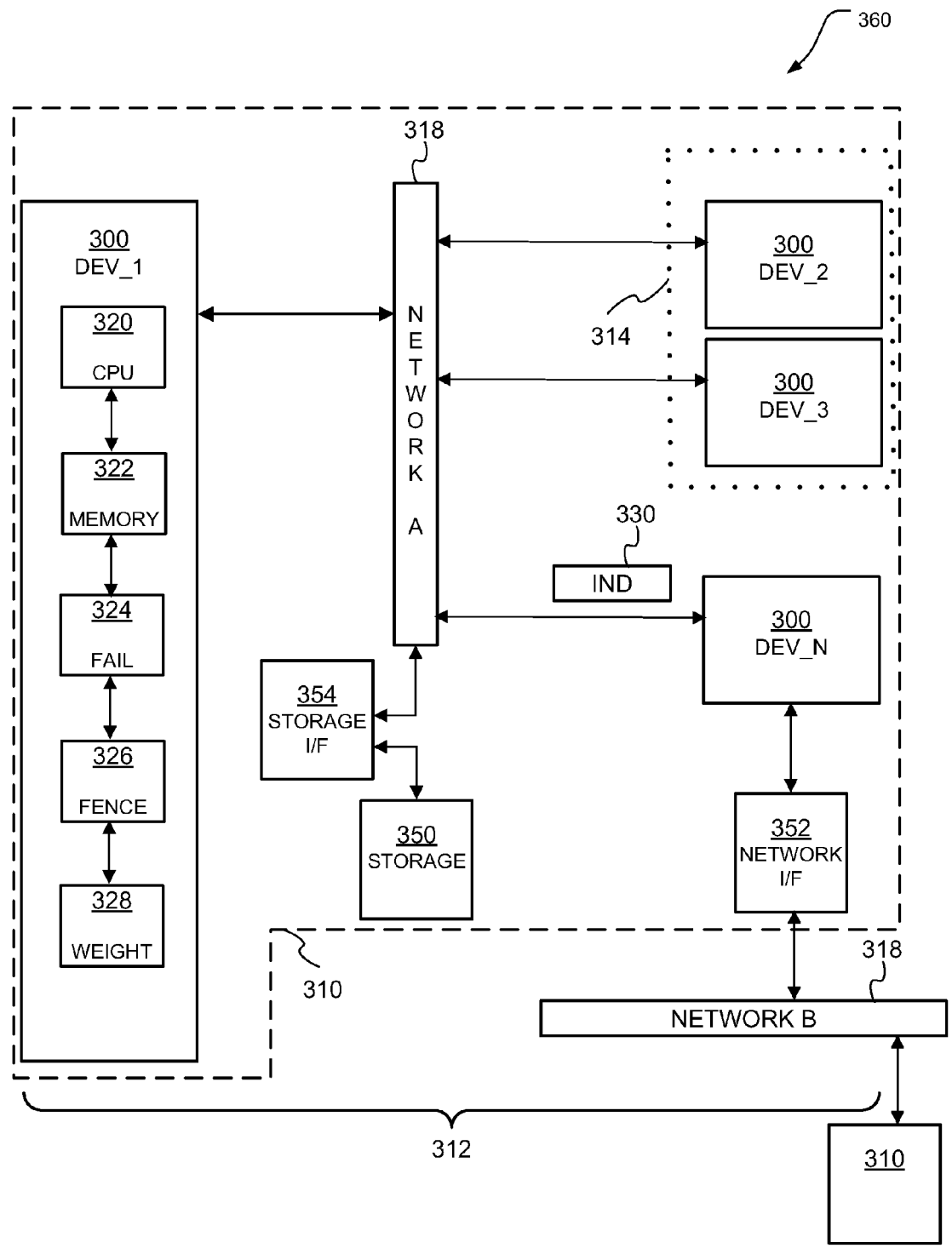
FIG. 3 is a block diagram of apparatus and systems to manage fencing in clusters according to various embodiments of the invention.

For example, FIG. 3 is a block diagram of apparatus 310 and systems 360 to manage fencing in clusters according to various embodiments of the invention. Here it can be seen that an apparatus 310 used to implement fencing management in clusters may comprise one or more processing nodes 300, one or more failure detection modules 324, and one or more fencing modules 326. The processing nodes 300 may comprise physical machines or virtual machines, or a mixture of both, as well as processor(s) 320 and memory 322. The nodes 300 may also comprise networked entities, such servers and/or clients. Therefore, the apparatus 310 may comprise a server, including a physical server or a virtual server, for example. Many additional embodiments may be realized.

For example, an apparatus 310 may comprise a network node 300 including a failure detection module 324 to detect a failure in a failed one (e.g., DEV_2) of a plurality of nodes 300 included in a cluster 312. The failure may be detected in some embodiments based on the occurrence of an indication 330, perhaps comprising a failure status indication. The apparatus 310 may also include a fencing module 326 to fence a portion 314 of the plurality of nodes 300, including the failed one, wherein membership in the portion 314 is determined according to an aggregated value of weighted values assigned to at least one of resources or services associated with the cluster 312.

The network node detecting the failure (e.g., DEV_N) may be located or included within the cluster 312 (as shown), or be located outside the cluster 312. Similarly, a module specifically used to assign the weighted values can be resident within the cluster 312, or not. Thus, the apparatus 310 may have a weight assignment module 328 included in the cluster to assign the weighted values.

In some embodiments, an apparatus 310 may comprise a first network node (e.g., DEV_1) in a cluster 312 including a failure detection module 324 to detect a failure in a failed one (e.g., DEV_2) of a plurality of nodes 300 included in the cluster 312. The apparatus 310 may also comprise a second network node (e.g., DEV_N) in the cluster 312 including a fencing module 326 to fence a portion 314 of the plurality of nodes, including the failed one, wherein membership in the portion 314 is determined according to an aggregated value of weighted values assigned to at least one of resources or services associated with the cluster 312. Thus, the apparatus 310 might comprise a cluster of nodes 300, including physical nodes or virtual nodes, for example.

In some embodiments, the apparatus 310 comprises one or more processing units 320 and/or storage units 350 as some of the resources. In some embodiments, the apparatus 310 comprises one or more network interfaces 352 and/or storage interfaces 354 as some of the resources. Still further embodiments may be realized.

For example, a fencing management system 360 may comprises multiple instances of the apparatus 300. The system 360 might also comprise multiple clusters 312 of nodes 300, including physical and virtual nodes.

The fencing management apparatus 300 and system 360 may be implemented in a machine-accessible and readable medium that is operational over one or more networks 318. The networks 318 may be wired, wireless, or a combination of wired and wireless. The fencing management apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
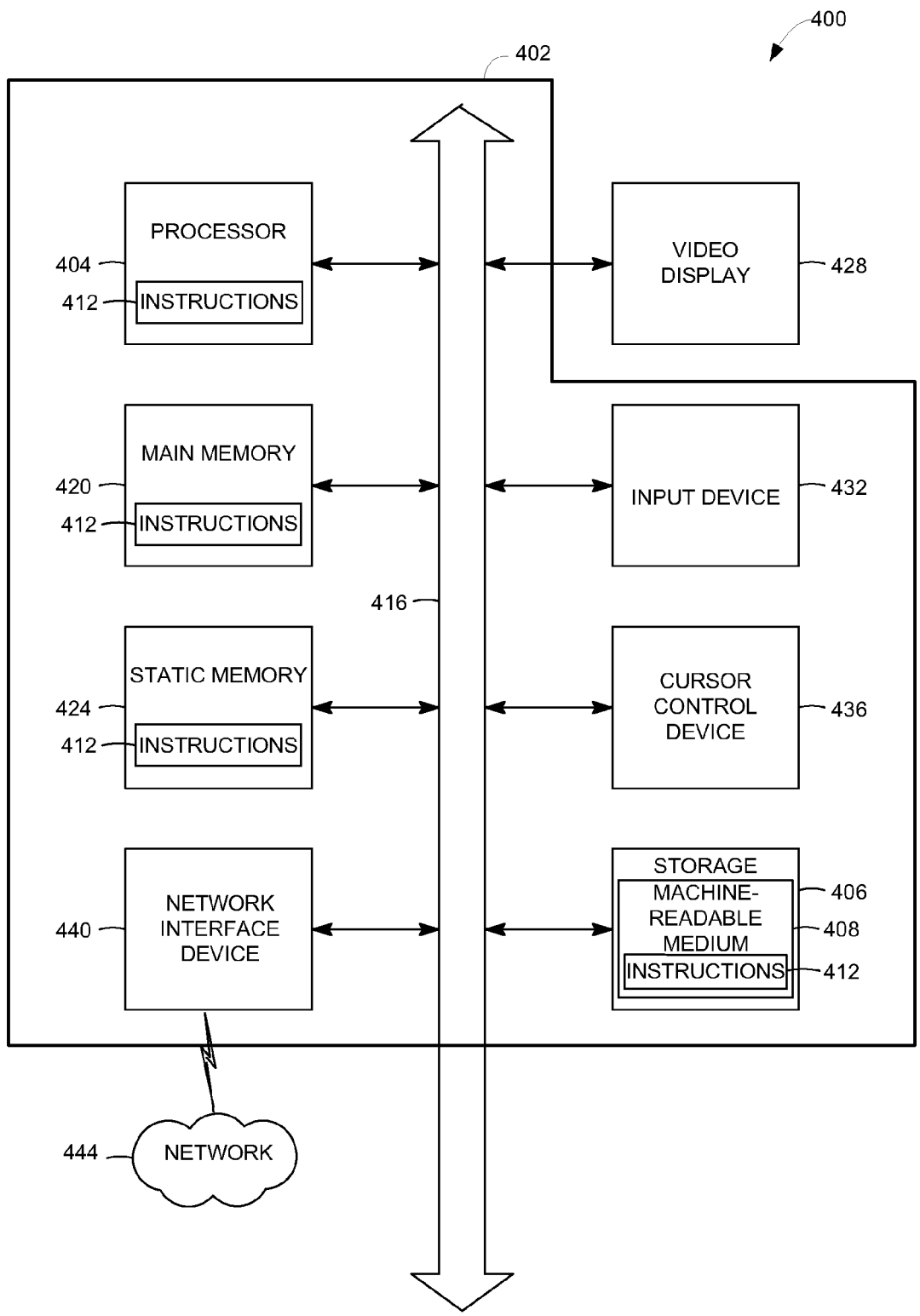
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a personal digital assistant (PDA), a cellular telephone, a web appliance, a network router, switch or bridge, server, client, or any machine capable of executing a set of instructions (sequential or otherwise) that specify actions to be taken by that machine. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to make fencing management more efficient when a node failure within a cluster of nodes occurs. Resources and services can be assigned weights at the time of configuration by an administrator, based on the relative importance each holds for the owner of the apparatus and/or system. Aggregated weight values can then be used to determine which nodes in the cluster survive, so that the cost of service failover is reduced. Thus, even if the majority of nodes are fenced, the fencing may still result in a lower overall cost to the owner, because system availability of resources and services may be increased.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a network node including a failure detection module to detect a failure in a failed node of a plurality of nodes included in a cluster; and
a fencing module to fence a portion of the plurality of nodes, including the failed node and at least one other node, wherein membership in the portion of the cluster is determined according to an aggregated value of weighted values respectively assigned to at least one of resources or services associated with the failed node and the at least one other node within the portion of the plurality of nodes included in the cluster.

2. The apparatus of claim 1, wherein the network node is included in the cluster.

3. The apparatus of claim 1, further comprising:
a weight assignment module included in the cluster to assign the weighted values.

4. An apparatus, comprising:
a first network node in a cluster including a failure detection module to detect a failure in a failed node of a plurality of nodes included in a cluster; and
a second network node in the cluster including a fencing module to fence a portion of the plurality of nodes, including the failed node and at least one other node, wherein membership in the portion of the cluster is determined according to an aggregated value of weighted values respectively assigned to at least one of resources or services associated with the failed node and the at least one other node within the portion of the plurality of nodes included in the cluster.

5. The apparatus of claim 4, further comprising:
at least one of a processing unit or a storage unit as some of the resources.

6. The apparatus of claim 4, further comprising:
at least one of a network interface or a storage interface as some of the resources.

7. A processor-implemented method to execute on one or more processors that perform the method, comprising:
detecting a failure in a failed node of a plurality of nodes included in a cluster; and
fencing a portion of the plurality of nodes, including the failed node and at least one other node, wherein membership in the portion of the cluster is determined according to an aggregated value of weighted values respectively assigned to at least one of resources or services associated with the failed node and the at least one other node within the portion of the plurality of nodes included in the cluster.

8. The method of claim 7, further comprising:
assigning a first portion of the weighted values based on relative resource value, and a second portion of the weighted values based on relative service value.

9. The method of claim 7, further comprising:
assigning a portion of the weighted values that depends on a relative number of the resources and/or the services that exist at a time of assignment, or forecast to exist at a future time.

10. The method of claim 7, further comprising:
assigning a portion of the weighted values that depends on a ratio of a number of the resources to a number of the services.

11. The method of claim 7, further comprising:
assigning a portion of the weighted values dynamically, based on at least one of client identity or a time.

12. The method of claim 7, further comprising:
assigning a portion of the weighted values according to an administrator policy or a pre-selected resource and/or service configuration.

13. The method of claim 7, further comprising:
assigning some of the weighted values as default values to resources and/or services that do not otherwise have an assigned value.

14. The method of claim 7, wherein the resources comprise at least one of a processing unit, storage, a storage interface, a network interface, or a floating internet protocol address within the cluster.

15. The method of claim 7, wherein the services comprise at least one of a database, a web site hosting service, a file access service, or a domain name resolution service.

16. The method of claim 7, further comprising:
determining the aggregated value as a deterministic function of the weighted values.

17. The method of claim 7, further comprising:
determining the aggregated value as a function of a first portion of the weighted values associated with the resources, and a second portion of the weighted values associated with the services.

18. A processor-implemented method to execute on one or more processors that perform the method, comprising:
respectively assigning weighted values to at least one of resources or services associated with a plurality of nodes in a cluster; and
when a failure in a failed node of the plurality of nodes is detected, fencing a first portion of the cluster that includes the failed node and at least one other node, the first portion having a lower aggregated value of the weighted values than a second portion of the cluster that is not fenced.

19. The method of claim 18, wherein the assigning further comprises:
assigning the weighted values to the resources according to a resource type.

20. The method of claim 18, wherein the assigning further comprises:
assigning the weighted values to the services according to a service type.

21. The method of claim 18, further comprising:
re-assigning some of the weighted values in response to at least one of an event occurring within the cluster, an event occurring outside the cluster, or a time.

22. The method of claim 18, further comprising:
determining the aggregated value as a function of the weighted values assigned only to the resources or the services.

23. The method of claim 18, further comprising:
detecting existence of the failed one as a result of communicating with a cluster membership module.

* * * * *